United States Patent Office 3,469,941
Patented Sept. 30, 1969

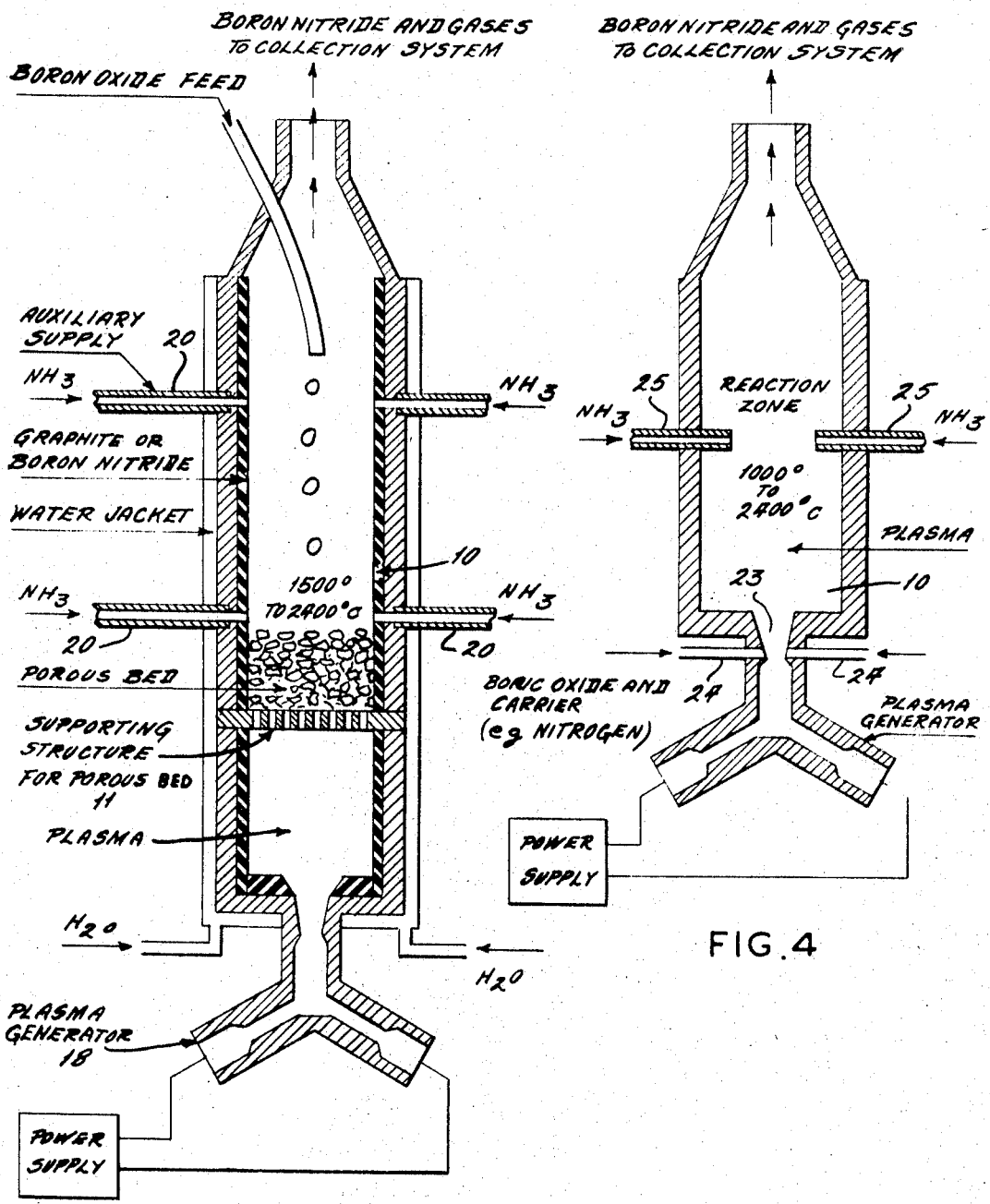

3,469,941
ULTRAFINE BORON NITRIDE AND PROCESS OF MAKING SAME
William E. Kuhn, Lexington, Ky., assignor to A. P. Green Refractories Co., Mexico, Mo., a corporation of Missouri
Filed Sept. 5, 1967, Ser. No. 665,486
Int. Cl. C01b 21/06
U.S. Cl. 23—191                                                           13 Claims

ABSTRACT OF THE DISCLOSURE

An ultrafine boron nitride product composed of white, equiaxed or spheroidal discrete particulate material of less than about 1000 A. composed of crystallites 200 A. and less in size having an "as produced" bulk density of 0.015–0.031 gm./cc. The product can be produced substantially pure or mixed with up to 50% boric oxide. The product is made by vaporizing boric oxide from a bed or porous media preferably composed of pieces of boron nitride which is maintained at a temperature of 1500 to 2400° C. Nitrogen carries the vaporized boric oxide into an adjoining reaction zone where it is mixed with anhydrous ammonia to produce the ultrafine boron nitride product. An arc plasma, induction, and resistance heating can be used to supply heat to the process. A modification includes the use of a plasma jet to directly vaporize the boric oxide and maintain it in a vapor state during the reaction with ammonia.

Background of the invention

Boron nitride is a highly refractory, inert material. Its potential applications are largely unrealized because of its relatively high cost and the lack of knowledge about its properties.

Boron nitride has outstanding dielectric properties and in solid form has the ability to be shaped with conventional machine tools. As a dielectrical material, however, it suffers from the presence of boric oxide, which renders its electrical properties sensitive to moisture in the atmosphere. In boron nitride produced by conventional hot pressing techniques, the boric oxide is essential for bonding the boron nitride particles together, with less than about 5% boric oxide producing a weakly bonded, porous material.

Presently, hot pressed boron nitride is not suitable for aerospace applications because the low melting point of boric oxide limits its usefulness to relatively low temperature applications. The high vapor pressure of boric oxide (B.P., 2400° C.) at moderately high temperatures results in its loss by vaporization and spalling of the surface, especially if moisture has been absorbed in the boric oxide. These disadvantages are overcome when the boric oxide is eliminated or replaced by a compatible but more refractory binder.

With lower cost, the more commonplace applications of boron nitride (e.g., those suggested by its resistance to corrosion by aqueous chemical solutions, molten metals, fused salts, etc.) are feasible.

In summary, boron nitride is an outstanding refractory material, but its full potential has not been exploited because of its relatively high cost and its inability to be consolidated in the pure form by sintering or hot pressing. These obstacles to full exploitation are overcome in the present process for producing a lower cost ultrafine boron nitride in a more active form that extends its scope of usefulness.

Several large scale applications are as follows:
(1) Incorporation as a dispersed phase in polymers, metals, and other nonmetallic materials to impart strength, desirable dielectric properties, resistance to corrosion, high temperature strength, etc.
(2) Combination with a binder to give a highly resistant mold wash for the casting of metals and ceramics.
(3) Parting compound in the cladding of metals, die-casting, etc.
(4) High temperature insulation with or without opacification to infrared or thermal radiation.
(5) Cosmetic and pharmaceutical applications, e.g., face powders, rouge, lipsticks, inert filler, etc.
(6) As a filler in coatings, slurries, paints and pigments and in lubricants and greases.

A unique feature of the process that clearly distinguishes this process from others is the capability of producing truly ultrafine particles that approach the size of nuclei formed in the vapor gas reaction between anhydrous ammonia and boric oxide vapor. In most commercial processes during reaction the boron oxide is in a finely subdivided liquid state, each particle being large enough to allow the formation of thin boron nitride films on the liquid surface. This film acts as a barrier between the unreacted boron oxide and the ammonia thereby greatly reducing the reaction rate. As a result, the product from existing commercial processes requires a second nitriding step to convert unreacted boron oxide in the first stage product to boron nitride. The inventor attempted to overcome this problem by an arc vaporization process described in U.S. Patent 3,232,706, Feb. 1, 1966, and a recent paper, W. E. Kuhn, "Production of Ultrafine Boron Nitride by Arc Vaporization," Electrochemical Technology, vol. 4, No. 3–4, March–April 1966. In this process boric oxide was directly vaporized at the anode termination of a DC arc. However, some distance away from the arc condensation occurred in the boric oxide saturated plasma resulting in the formation of ultrafine spheroidal particles, many less than 0.1 micron in diameter. Electron microscopy revealed a barrier film of boron nitride on the spherical particles. The short residence time in the reactor was not sufficient for full nitriding due to the inhibiting action of the barrier film thereby necessitating a second nitriding treatment for much longer times depending on the temperature.

I have overcome this problem in the present invention by providing for more intimate mixing of the ammonia and the boric oxide vapor before the latter has had an opportunity to condense into relatively large liquid spheres susceptible to barrier film formation.

This was accomplished by increasing the surface area available for vaporization by means of a porous bed maintained at the vaporization temperature and nitrogen as a carrier gas (inert gases may also be used such as argon, helium). The nitrogen also served to dilute the boric oxide vapor-nitrogen mixture and thereby reduce the tendency to condense into larger particles. Ammonia is directed into the boric oxide-nitrogen mixture directly as the vapor leaves the porous bed and before the boron oxide has had a chance to condense and grow into larger particles in cooler regions of the furnace. This initial nitriding effectively reduces the concentration of boric oxide vapor thereby further reducing any tendency to grow into larger particles. Any unreacted liquid boric oxide particles are converted to boron nitride with additional ammonia a certain distance away from the porous bed and at a somewhat lower temperature than the porous bed.

The porous bed may be dispensed with and the boric oxide introduced as a fine powder into the hot nitrogen gas at a temperature which will rapidly vaporize the boric oxide.

In a modification an arc plasma or plasma jet may be used to vaporize the boric oxide and will accomplish the end result achieved by the porous bed.

Summary of the invention

The present invention comprises a product containing ultrafine boron nitride consisting of larger particles composed of ultrafine primary particles of hexagonal boron nitride having a thickness in the $c$-direction of between 20 A. and 50 A. The product is of white color. The present invention also comprises the process of making the ultrafine boron nitride product which includes vaporizing boric oxide in a bed of porous media which may be heated electrically by induction, plasma, or resistance and reacting the vaporized oxide with anhydrous ammonia to produce a boron nitride product containing from essentially zero up to 50 percent boron oxide. Product containing boron oxide may be renitrided with anhydrous ammonia to convert the remaining boric oxide to boron nitride to a desired degree (e.g., hot pressing grade BN requires about 5 percent $B_2O_3$).

Description of the drawings

In the accompanying figures wherein like numbers refer to like parts wherever they occur:

FIGURE 3 is a modified reactor utilizing an arc plasma as the means for heating a porous bed, and FIGURE 4 is a modified reactor utilizing an arc plasma without a porous bed.

Detailed description

Boric oxide is allowed to flow over heated surfaces at temperatures between 1400° C. and the boiling point of $B_2O_3$. These surfaces take the form of a "porous bed." The boiling point of boric oxide at 760 mm. is variously reported between 2250 and 2300° C.; therefore, operating temperatures are in the neighborhood of 2000° C. (between 1500° C. to 2400° C.) in the porous bed. The vapors of boric oxide and other boron species are transported by a "carrier" gas ($N_2$) to a reaction zone (maintained between 800° C. and 2400° C.) where they mix and react with ammonia gas. The gaseous products of reaction, thermal expansion of the carrier gases and dissociation products from excess ammonia ($N_2$ and $H_2$) develop a sufficient gas flow to carry the product from the reaction zone.

Boric oxide as used herein includes orthoboric acid, metaboric acid, pyroboric acid, and condensed boric acids. Anhydrous boric oxide is the preferred form since the presence of water of hydration presents problems associated with foaming and bubbling of the molten boric oxide compound.

A partial vacuum may be employed to increase the pressure differential, hence, the flow between the reaction zone and the product outlet port, while simultaneously increasing the evaporation rate of boric oxide. One of the chief problems is to prevent excessive dissociation of the $NH_3$ before reacting with the boric oxide vapor. This is accomplished by maintaining a very short path between the sources of the $B_2O_3$ vapor and the $NH_3$, and by maintaining the latter at a low temperature before it enters the reaction zone.

Boric oxide vapors are generated by heating the liquid boric oxide flowing over a porous bed of carbon, graphite, or boron nitride (boric oxide vapor and nitrogen carrier gas in the presence of carbon reacts to form boron nitride). Ammonia is directed into the reaction zone immediately above the porous bed or diffused into the reaction zone through a porous carbon or graphite tube or one with a large number of small bore inlet ports. The products of the reaction $$B_2O_3 + NH_3 \rightarrow 2BN + 3H_2O$$

and dissociation products of $NH_3$ are carried out of the reaction zone, out of the reactor, and into the product collection system.

Figure 1:
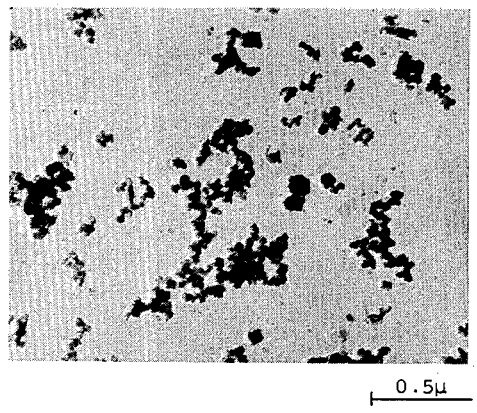
FIGURE 1 is an electron micrograph of the present product.

The boron nitride of the present invention is shown in FIG. 1. The product is an agglomerated material consisting of ultrafine equiaxed or spheroidal particles composed of smaller boron nitride crystallites less than 200 A. in size (preferably having a thickness in the $c$-direction of between 14 A. and 25 A.) and of a white color. This product has a bulk density of about 0.015 to about 0.031 gm./cc. The product has a lattice spacing of about 3.36–3.50 A. in the (002) direction.

Figure 2:
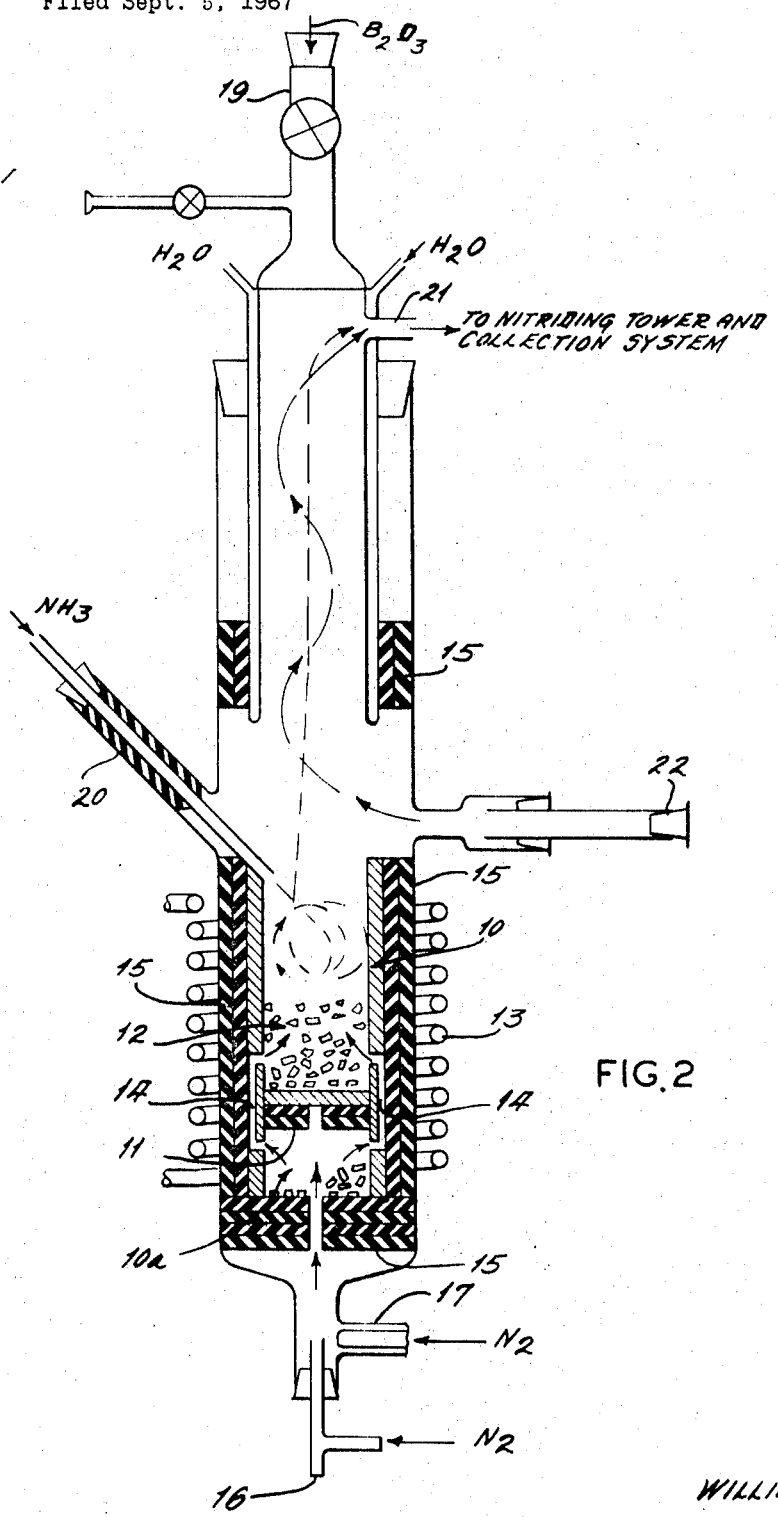
FIGURE 2 is a schematic representation of a suitable reactor using induction heat.

The device shown in FIG. 2 in an experimental apparatus used to make the foregoing ultrafine boron nitride particles and comprises a cylindrical reaction member 10 which may be formed of boron nitride, graphite, or different parts of either of the foregoing materials. If member 10 is made of boron nitride, an outer sleeve, serving as a susceptor, is required with induction heating. The reaction chamber 10 is set on an end and is provided with a support portion 11 adjacent to the bottom end. This is in the heating zone and supports the porous bed media 12 which may be of graphite or boron nitride or combinations of the two. The boron nitride has the advantage that boric oxide does not stick to it. However, the graphite porous media is coated with boron nitride soon after the reaction starts, and then operates at an equilibrium with the in situ boron nitride serving as a barrier to further reaction so as not to consume excessive boric oxide or graphite, in the process. Similarly, the inner surfaces of the reaction chamber, if constructed of graphite, will soon take on a conversion coating of boron nitride. The porous bed media 12 are about 0.375 to 0.5 inch in size but may be larger or smaller depending on the size of the reactor. Beneath the support 11 is a chamber 10a where nitrogen is partially heated by radiation and convection by means of an induction coil 13 encircling the reaction chamber 10. The nitrogen is passed by the base 11 by means of conduits 14 in the wall of the reaction chamber 10 and thus introduced into the porous bed media 12. Insulation 15 surrounds the reaction chamber 10. A sight window 16 is used to measure the temperature of the bed 12. Other inert carrier gases such as argon, helium, etc., can be used as well as nitrogen. These are also introduced into the port 17.

A plasma generator 18 (FIG. 3) can be used as a heat source instead of the coil 13 of FIG. 2, and the heated plasma (e.g., nitrogen) from the generator 18 is introduced into the porous bed media 12 to heat the same.

The porous bed media 12 is maintained at 1500° to 2400° C. so as to completely vaporize boric oxide which is introduced through a top opening 19 into the chamber 10 (preferably in rodlike or spherical form) and which, when it strikes the hot porous bed 12, flows through the bed and is vaporized and normally is carried upwardly by the nitrogen or plasma gas to an adjacent reaction zone where it is reacted with anhydrous ammonia deposited into the chamber 10 through a side conduit 20. Additional conduits may be used to provide ammonia to convert unreacted boron oxide to boron nitride. The conduit 20 enters the chamber 10 immediately above the reaction zone and closely adjacent to the top of the porous bed 12. The reaction zone may be maintained at temperatures between 600°–2400° C. The boron nitride produced by this process is substantially pure although it can incorporate up to 50% boric oxide. A preferred invention is to utilize the process to obtain a mixture of 95% boron nitride and 5% boric oxide to produce a product which is substantially ready for hot pressing into refractory articles.

The upper portion of the reaction chamber 10 is water-cooled and the boron nitride exits at 21 to a nitriding tower and/or collecting system (not shown and not part of this invention). A sight window 22 is used to measure the temperature at the area of $NH_3$ addition to the reaction chamber 10.

The plasma jet system shown in FIG. 3 may use a standard plasma jet 18 (readily available commercially) in which a plasma is generated and nitrogen or other suitable gas is supplied to the device so as to be carried with the plasma into the bottom of the porous bed where it filters upwardly through the bed and carries vaporized boron oxide out of the bed. Using this technique, the lower portion of the porous bed is hotter than the upper portion. This tends to insure that the boric oxide is all vaporized before it reaches the bottom of the porous bed.

FIG. 4 shows a modification of the reaction system which utilizes a plasma to vaporize the boric oxide and react it with $NH_3$. The plasma generator 18 has finely powdered boric oxide introduced at the throat 23 through a conduit 24. The boric oxide is fluidized and carried by an inert gas (nitrogen) into the hot plasma where it is vaporized and reacted in the reaction zone 10 with $NH_3$ introduced thereinto through the conduits 25. The reacted boron nitride and gases leave the top of the chamber 10 and to a collection system.

The foregoing system works best when the following conditions are met:

(1) The boric oxide is fully vaporized in the nitrogen plasma (or inert gas plasma);

(2) Condensation of the boron oxide is prevented or liquid particles no larger than that which will fully nitride are allowed to form.

(3) The residence time of the boric oxide in the vapor state is long enough to give the ammonia an opportunity to mix and react with the boric oxide vapor before it condenses into large particles susceptible to boron nitride barrier film formations; and (4) The ammonia is not allowed to fully dissociate into molecular nitrogen and hydrogen before contacting the boric oxide vapor.

One problem with direct vaporization of boric oxide in arc plasma (or more specifically a nitrogen plasma) is related to the high velocity of the plasma and consequently short residence times of the boric oxide at practical vaporizing temperatures (about 2000° C. and higher).

Yields per kilowatt of power for spheroidizing and vaporizing inorganic materials are notably low in the usual type of plasma jet due to the short residence times at the temperature of rapid melting and vaporization. The residence time must be sufficient to fully vaporize the feed particles before contacting the ammonia. Also reaction with ammonia must occur in that region of the arc plasma stream where (1) The feed particles are fully vaporized; and (2) The boric oxide vapor has not condensed into liquid droplets large enough to be susceptible to boron nitride barrier film formation.

This region in an arc plasma is very short, hence limiting the amount of material that can be reacted efficiently. The use of high enthalpy, low velocity, laminar plasma flames alleviates this problem.

Description of operation

Boric oxide is supplied in the form of fusion cast cylinders 0.5 inch in diameter and about 0.75 inch long. Each cylinder weighed on average about five grams.

A typical operating procedure consists of purging the system with nitrogen and applying energy to the vaporizer with a low nitrogen flow. When the desired operating temperature is reached, the calibrated flowmeters are adjusted to preselected values and boron oxide additions are initiated and continued at regular intervals.

Nitrogen entering the porous bed section of the vaporizer is preheated during its passage into the porous bed. Ammonia enters the boron nitride reaction zone through the side tube at such an angle as to strike the top of the porous bed. A swirling action is imparted to the mixture of ammonia, nitrogen, hydrogen, and ultrafine boron nitride, thereby extending the residence time in the reaction zone somewhat and increasing the opportunity for boron nitride formation.

Temperature is measured optically by sighting onto a black body target hole at the bottom of the vaporizer. The flow of nitrogen affects the temperature recorded at this point to a significant degree. For example, with a nitrogen flow of 3.0 liter/min. and 6.5 liter/min., the temperature recorded with 1860° and 1830° C., respectively. The temperature within the porous bed is not believed to be greatly different from that measured.

The fume, vapor and gases from the reaction zone are carried into the ductwork of the collecting system. A substantial proportion of the product collects on the water-cooled feed tube situated above the vaporizer. If significant amounts collect within the ductwork, the pressure rises in the system. Therefore, the ducts should be of sufficient diameter, have short travel paths, and the carrier gas flows should be sufficiently high to minimize wall buildup.

Fume agglomerates during passage through the ductwork and within the electrostatic precipitator. Product is collected in the hoppers beneath the precipitator and on the filter and associated collection vessels. Most of the product is collected in the container directly beneath the precipitator and on the water-cooled feed tube within the quartz reactor.

"Porous bed" vaporizer

The "porous bed" vaporizer used with the reactor of FIGS. 2 and 3 performs the following functions:

(1) It preheats nitrogen carrier gas before it is circulated through the porous bed.

(2) It provides vaporizing surface for the boric oxide. The surface of the porous graphite media is coated with an inert nonwettable surface of boron nitride.

(3) It collects excess boric oxide.

(4) It serves (when it is made of graphite) as a susceptor for the induction heater of FIG. 2.

(5) It provides a reaction zone or space above the porous media for reaction between $B_2O_3$ vapor and ammonia.

Each addition of boric oxide to the reaction chamber usually produces a steep rise in the temperature which coincides with vaporization and reaction of boric oxide with ammonia. Observations through a sight window revealed that the sudden rise in temperature was preceded by a short delay before fume was produced. Fume was not evident at 2000° C. for about 15 to 20 seconds after addition of the boric oxide. This delay is attributed to the time taken for the boric oxide to reach a temperature at which appreciable amounts of fume begin to be produced, i.e., about 1500° C. The sudden rise in temperature is caused by the sudden outflow of hot gas from the furnace.

The temperature continues to rise until all or most of the boric oxide is vaporized at which point the temperature levels off or drops slightly. Assuming that the time between the end of the delay and termination of the rise represents the time to vaporize approximately five grams of boric oxide, the vaporization rate may be fairly accurately estimated at the operating temperature of the reactor. In terms of the cross-sectional area of the vaporizer, the average rate at approximately 2000° C. varied between 72 and 195 grams per square inch of internal cross-sectioned area depending on the particular vaporized configuration, porous bed, depth, and nitrogen flows employed.

The following is a table of results from particular runs on the aforementioned apparatus showing the characteristics of the produced product:

| Run No.: | Boron nitride content (percent) | Particle thickness $L_c$ (A.) | Lattice spacing for (002) plane d (A.) | Bulk density (gm./cc.) | Color |
|---|---|---|---|---|---|
| 41-29 | 81.1 | 17.7 | 3.54 | 0.030 | White. |
|  |  | 16.9 | 3.59 |  |  |
| 41-41 | 77.6 | 15.1 | 3.64 | 0.015 | Do. |
| 41-44 | 90.5 | 16.9 | 3.58 | 0.031 | Do. |

Morphology

The morphology and particle size of the ultrafine boron nitride made by the subject process hereafter referred to as "as produced" boron nitride is unique in compraison with available boron nitride products. The morphology and particle size is very similar to that of "reinforcing" or "high structure" carbon blacks. For example, the boron nitride produced experimentally in the subject process displays two-dimensional crystallinity as does "high structure" carbon black. The (002) reflection associated in carbon black with nearly parallel stacking of platelets is found in boron nitride produced by the subject process. Further, the absence of the (004) reflection is indicative of the random layer-lattice of the primary crystallites. The interlayer or "c" spacing is nearly the same, being in the neighborhood of 3.5 A. for both materials. The thickness of the crystallites in both materials in the "c" direction is also similar being about 13 to 24 A. for carbon black and, about 14 A. to 25 A. for the boron nitride. As with carbon black, the "c" spacing of the subject boron nitride is larger than the value of 3.33 A. for bulk boron nitride. Electron micrographs of the product are similar to those for "high structure" carbon blacks, and resemble the boron nitride shown in FIG. 1. The bulk density of the "as produced" boron nitride ranges from about 1 to 2 pounds per cubic foot compared to 3 to 10 pounds per cubic foot for carbon blacks in general.

An electron micrograph of the "as produced" product is shown in FIG. 1. The product consists of single particles and agglomerates of individual particles less than about 1000 A., each particle being composed of smaller crystallites estimated to be about 14 A. to 25 A. in thickness and 45 A. to 100 A. in breadth as determined by X-ray line broadening of the (002) and (10) peaks, respectively. The lattice spacing in the (002) direction is 3.36–3.50 A. This is attributed to stacking disorder between the layer planes and the small "a" dimension of the particles, the effect of which is to reduce the attractive force holding the planes together. The small crystallite size probably has a marked effect on the heat and electrical resistivity of the boron nitride. It has been found that the thermal conductivity of ultrafine carbon of about the same particle size as the boron nitride is many times smaller than polycrystalline carbon.

The low bulk density can be increased to more manageable values if desired by spray drying or mixing with suitable liquids and drying into a cake.

SUMMARY OF NITRIDING EXPERIMENTS

| | Nitriding temperature (° C.) | Time at temperature (hours) | Boron Nitride Content After Nitriding | |
|---|---|---|---|---|
| | | | Before | After |
| Experiment No.: | | | | |
| 41-60 | 800 | 2 | 90.5 | 93.4 |
| 47-49 | 862 | 2 | 67.4 | 99.6 |

Earlier work by the inventor, Kuhn, W. E., Ultrafine Particles, John Wiley and Sons, New York, 1963, has shown that "arc produced" boron nitride containing about 53% boric oxide could be converted to product containing about 84% boron nitride at 900° C. for two hours. The more efficient nitriding obtained with the product from the subject process is attributed to the extreme fineness of the "as produced" product and its initial higher boron nitride content.

It was found that the ultrafine fully nitride powder was highly hydrophobic and when a small amount was used to coat paper or cloth, it rendered these materials water repellant.

Hot pressing

The nitrided "as produced" powder was hot pressed in a 0.562 inch diameter graphite mold in a nitrogen atmosphere. The low density of the "as produced" powder necessitated the use of a slurry of the powder made with a volatile liquid to fill the mold with sufficient material to produce a compact of the desired size. Toluene was used in blends of the fully nitrided powder and "as produced" boron nitride to avoid loss of boric oxide as volatile boron compounds. The liquid also served as an effective lubricant giving higher green densities than otherwise would be obtained with dry powders.

The results of the hot pressing experiments are summarized in the following table:

SUMMARY OF HOT PRESSING EXPERIMENTS

| | Boron[1] nitride content (percent) | Hot pressing temperature (° C.) | Approximate drop temperature (° C.) | Pressure (p.s.i.) | Density (g./cc.) | Slurry liquid |
|---|---|---|---|---|---|---|
| Experiment: | | | | | | |
| 47-51 | 99.6 | 1,685 | 1,150 | 1,600 | 1.20 | Methyl alcohol. |
| 47-53 | 95.0 | 1,650 | 1,400 | 1,600 | 1.81 | Toluene. |
| 47-55 | 92.5 | 1,800 | 1,550 | 1,600 | 1.99 | Do. |

[1] Before hot pressing.

Notes (1) Fully nitrided "as produced" product was used in Experiment 47-51. A mixture of 80% nitrided powder analyzing 99.6% BN and 20% of "as produced" powder analyzing 75% BN blended to give a mixture containing 95.0% BN was used in Experiment 47-53. Similarly, 70% and 30% of the 99.6% and 75% BN powders blended to give a mixture containing 92.5% BN was used in Experiment 47-55.

(2) Pressure maintained throughout heating period and then one minute at hot pressing temperature.

(3) The drop temperature is that temperature at which the hot pressed material begins to rapidly consolidate as indicated by a rapid compression of the material in the mold and hence drop of the mold plunger.

Various modifications and changes will be readily apparent to those skilled in the art and all such changes and modifications are deemed to be within the scope of the invention which is limited only by the scope of the appended claims.

What is claimed is:

1. An ultrafine boron nitride product having a bulk density of about 0.015 to about 0.031 gram/cc. and consisting of spheroidal particles composed of primary crystallites, as characterized by X-ray diffraction, having stacked graphite-type lamellae in which the layers are arranged at random (as regards both translations of one layer with respect to another and rotation about the normal to the planes) having an average particle thickness in the "c" direction perpendicular to the layer-lattices and designated, $L_c$ of about 14 to 25 A., and a "c" spacing for the (002) of about 3.36 to 3.50 A., said product being hydrophobic in pure form.

2. The ultrafine boron nitride product of claim 1 having greater than 50% purity, composed of individual particles and agglomerates of these particles, said particles being less than about 1000 A.

3. A method of making an ultrafine boron nitride product comprising the steps of
  (a) introducing an inert gas into a porous bed of material compatible with boron nitride at temperatures between 1500° C. to 2400° C.,
  (b) introducing a $B_2O_3$ reactant selected from the group consisting of boric oxide, orthoboric acid, metaboric acid, pyroboric acid, condensed boric acid and mixtures thereof into the porous bed,
  (c) maintaining the temperature in the porous bed at 1500° C. to 2400° C.,
  (d) vaporizing the boric oxide,
  (e) transporting said boric oxide in vapor state from out of the bed into an adjoining zone,
  (f) maintaining the temperature in said adjoining reaction zone at a temperature between 600° C. and 2400° C.,
  (g) reacting the said boric oxide vapor with anhydrous ammonia in said adjoining zone, and
  (h) collecting ultrafine boron nitride of greater than 50% purity.

4. The method of claim 3 wherein the inert gas and the porous bed are heated by induction.

5. The method of claim 3 wherein the gas is plasma heated prior to being introduced into the porous bed and the porous bed is heated to the temperature of vaporization by the plasma heated gas.

6. The method of claim 3 wherein the boron nitride is renitrided with ammonia at temperatures ranging from 600° C. to 2400° C. to produce a product of substantially 100% pure boron nitride.

7. The method of claim 3 wherein the collected boron nitride is renitrided with ammonia at temperatures ranging from 600° C. to 2400° C. to produce a product of substantially 100% pure boric nitride but varying in particle size, depending on the renitriding temperature, from that of the "as produced" boron nitride characterized in claim 1 up to platelets several mircons in breadth and up to about 1000 A. in thickness.

8. The method of claim 3 wherein the mixture of $NH_3$ inert gas and ultrafine boron nitride is intimately blended in the reaction zone at the upper portion of the porous bed.

9. The method of claim 3 wherein the material forming the porous bed has surfaces coated with boron nitride and the liquid boric oxide is vaporized from said surfaces.

10. The method of claim 3 wherein the porous bed is of boron nitride.

11. The method of claim 3 wherein the reactor is constructed from a material selected from the group consisting of graphite, boron nitride and combinations thereof.

12. A method of making ultrafine boron nitride product of the morphology and characteristics described in claim 1 by a process comprising the steps:
  (a) introducing finely powdered boric oxide into a plasma column thereby vaporizing it,
  (b) directing the plasma heated carrier gas and vaporized boric oxide into a reaction zone of larger volume and lower temperature,
  (c) mixing the boric oxide vapor and carrier gas with ammonia in said reaction zone at a temperature which causes the boric oxide vapor to react with the ammonia to form ultrafine boric nitride,
  (d) maintaining the temperature within the reaction zone between 600° C. and 2400° C., and
  (e) collecting ultrafine boron nitride particles containing controlled amounts of boric oxide from 0 to 50 percent.

13. A method of making an ultrafine boron nitride product comprising the steps of:
  (a) vaporizing $B_2O_3$ in a first heated vaporization zone, and thereafter
  (b) reacting said $B_2O_3$ vapor with $NH_3$ gas in an adjacent zone to condense ultrafine spheroidal discrete particles of boron nitride of greater than 50% purity, said product being hydrophobic and of a bulk density of about 0.015 to about 0.031 gm./cc.

References Cited

UNITED STATES PATENTS

| 3,232,706 | 2/1966 | Kuhn | 23—191 |
| 3,241,919 | 3/1966 | O'Connor | 23—191 |
| 3,253,886 | 5/1966 | Lamprey et al. | 23—191 X |
| 3,332,870 | 7/1967 | Orbach et al. | 204—178 X |

EDWARD STERN, Primary Examiner

U.S. Cl. X.R.

106—55; 204—177